United States Patent [19]

Gill et al.

[11] 3,809,817

[45] May 7, 1974

[54] ASYNCHRONOUS QUADRIPHASE COMMUNICATIONS SYSTEM AND METHOD

[75] Inventors: Walter J. Gill, Saratoga; James A. Mellenger, Sunnyvale, both of Calif.

[73] Assignee: Avantek, Inc., Santa Clara, Calif.

[22] Filed: Feb. 14, 1972

[21] Appl. No.: 225,823

[52] U.S. Cl. ............ 179/15 BS, 178/67, 179/15 BA
[51] Int. Cl. ............ H04j 3/06
[58] Field of Search ....... 179/15 BS, 15 BC, 15 BA, 179/15 BT, 1.5 S, 1.5 E, 1.5 M; 178/69.5 R, 67, 22; 325/32, 122

[56] References Cited

UNITED STATES PATENTS

| | | | |
|---|---|---|---|
| 3,242,262 | 3/1966 | Melas | 178/66 R |
| 2,905,812 | 9/1959 | Doelz | 179/15 BC |
| 3,518,547 | 6/1970 | Filipowski | 179/15 BC |
| 3,659,046 | 4/1972 | Angeleri | 325/32 |
| 3,624,303 | 11/1971 | Hilbert | 179/15 BS |
| 3,603,882 | 9/1971 | Wilson | 179/15 BC |

*Primary Examiner*—Kathleen H. Claffy
*Assistant Examiner*—David L. Stewart
*Attorney, Agent, or Firm*—Limbach, Limbach & Sutton

[57] ABSTRACT

A communications system and method for transmitting and receiving two independently timed (asynchronous) binary data signals on a quadriphase carrier. The four phase ambiguity ordinarily resulting from quadriphase transmission and reception is overcome by uniquely identifying each input channel, for example, by scrambling. In reception each channel is demodulated and applied to a corresponding descrambler. The descrambler outputs are sequentially examined to recognize any non-random characteristic of the data signals; recognition indicates connections from the demodulator to the descrambler in the correct sense. If there is no recognition, the connections are reversed and the scrambler outputs are again examined until recognition is achieved thus providing the original binary data signals.

19 Claims, 10 Drawing Figures

ASYNCHRONOUS QUADRIPHASE COMMUNICATIONS SYSTEM AND METHOD

BACKGROUND OF THE INVENTION

This invention relates to communications systems and more particularly to a system and method for transmitting and receiving two independently timed PCM (pulse code modulation) signals carried on a single quadriphase modulated carrier.

The quadriphase modulation technique is also known as quaternary phase shift keying, QPSK, four-phase modulation, four-level phase modulation and quaternary phase modulation.

As commonly implemented, the input to a quadriphase modulator is either two synchronous bit streams or a single serial bit stream that is divided into two parallel bit streams prior to carrier modulation. The timing for synchronous bit streams must be generated by the same oscillator or by phase-locked oscillators and the bit stream state transitions when they occur must coincide.

In a quadriphase modulated system, the receiver can detect phase shifts resulting from modulation but cannot measure the absolute phase states unless a transmitted phase reference is also provided. A transmitted reference requires additional power and is not commonly used. The receiver is usually designed to operate on the available information in the received signal to unambiguously demodulate and recover the original PCM bit streams.

In the case of synchronous quadriphase systems, unambiguous signal recovery is accomplished by digitally encoding the four possible PCM signal states, e.g., 00,01,10 or 11, into carrier phase changes of say no change for 00, +90° change for 01, −90° change for 10 and 180° change for 11. The receiver then, being able to uniquely detect carrier phase changes, unambiguously decodes them into the original PCM signal states. This type of encoding is known as quaternary differential encoding. Coding of this type is not possible, however, with asynchronous PCM input signals.

Early patents directed to conventional four-phase modulation systems having synchronous inputs include U.S. Pat. Nos. 2,870,431 to D. F. Babcock and 2,905,812 to M. L. Doelz et al.

In U.S. Pat. No. 3,242,262 to C. M. Melas, et al., a four-phase modulator is disclosed wherein, as an alternative, two separate unrelated channels of information may be applied. However, no means for providing unambiguous recognition of the two original channels is disclosed.

A further four-phase modulation scheme having asynchronous data inputs is discussed in an article by Lucio M. Vallese in Microwaves for Aug. 1971 at page 10. No means for providing unambiguous recognition of the asynchronous channels is disclosed.

SUMMARY OF THE INVENTION

In accordance with the teachings of the present invention a new and improved method and system for quadriphase transmission of two asynchronous PCM signals with unambiguous recognition and recovery of the original PCM transmitter input channels is provided.

This method, which will be referred to as asynchronous quadriphase, uniquely identifies each data channel prior to transmission. The receiver then looks for this unique signature and identifies the channels accordingly.

One technique to do this requires that the input binary signals possess known or regularly occurring characteristics. Such signals are modified at the transmitter, for example, by a scrambler code unique to each channel. The inverse operation is then performed by descramblers located in the receiver and the resulting outputs are examined by channel recognition circuitry to determine the presence of the known or regularly occurring characteristics contained in the original data. Since each descrambler has a code that matches the corresponding transmitter scrambler code, the known characteristics in the demodulated channels can only be recognized after the binary signals have passed through the correct descramblers. If recognition occurs then the PCM signals are unambiguously recovered. If recognition does not occur then the routing of the binary signals through the descramblers is switched and correct channel recovery will result.

In the event that the unmodulated binary signals do not possess known and regularly occurring characteristics, an alternate means of channel identification which does not require unique scrambling/descrambling operations can be utilized; for example, by inserting a low-index frequency modulation component to the data clocks for each channel prior to transmitting the data. The frequency modulation could be inserted, for example, in the phase locked loop used for bit synchronization. Each channel would be modulated by a different frequency, $f_a$ and $f_b$, and the modulation index would be small enough to prevent excessive phase error from occurring in the bit synchronizers used to receive the data in the receiver. The net effect of this low-index frequency modulation on the transmitted data would be to add a slight amount of timing jitter in addition to whatever timing jitter may have existed on the unmodulated binary signals.

To unambiguously receive the signals, the data timing derived from phase-locked bit synchronizers located in the receiver would be monitored for the presence of these low frequency components. A decision based on the relative signal strengths of $f_a$ and $f_b$ would then be used to properly identify the A and B data channels.

The two frequencies, $f_a$ and $f_b$, would be small enough so as not to significantly influence the transmitted spectrum. Furthermore the additional timing jitter intorduced by $f_a$ and $f_b$ could be cancelled out in the receiver prior to outputting the data to the user if necessary.

Of specific interest in this invention is the transmission of PCM voice and digital data traffic over point-to-point microwave radio systems. The PCM signals are in a format known as "T1" signals in Western Electric Company terminology. Each T1 signal contains 24 digitally formatted voice circuits, digital data or a mixture of voice and data. The format of the T1 signal consists of a frame of 193 bits having 24 consecutive 8 bit channels representing the 24 circuits in a time-division multiplex arrangement. The 193rd bit is a frame bit, which alternates between 1 and 0 in alternate frames. The framing bit is adequate to function as a known recurring characteristic.

It is desirable in placing two T1 PCM signals on microwave to accommodate independently clocked channels without an intervening expensive PCM multiplexer. This invention makes such applications possible by monitoring the frame bits in each T1 PCM channel. When the signals are routed through the correct descramblers, the frame bits are readily recognized. When the channels are routed incorrectly in the receiver, the descramblers will prevent recovery of the frame bits and the channel routing will be switched.

In addition to recognizing the frame bits in T1 signals, the receiver can also be configured with the appropriate channel recognition circuits to handle other signal format characteristics, such as framing patterns for signals other than the T1 format; continuous runs of ones or zeros in the signal patterns; inverted or non-inverted deterministic properties of bit streams such as duty cycle or average value of binary ones or zeros.

For those applications where inverted or non-inverted bit streams exhibit unique properties, the scrambler and descrambler for one channel can be removed and the scrambler and descrambler for the other channel replaced by polarity inverters.

While a portion of the present specification is directed to a system intended to accept two asynchronous T1 channels as inputs, the invention is also applicable to use with any code having known periodic characteristics; that is any non-random code.

Further, random codes may also be employed with the invention if an identification is added to the code channels or if periodic test signals are used as described herein. Thus, it is to be understood that the specific embodiment described herein is not intended to limit the scope of the invention but merely to set forth the best mode presently contemplated.

DESCRIPTION OF THE PREFERRED EMBODIMENTS

Figure 1:
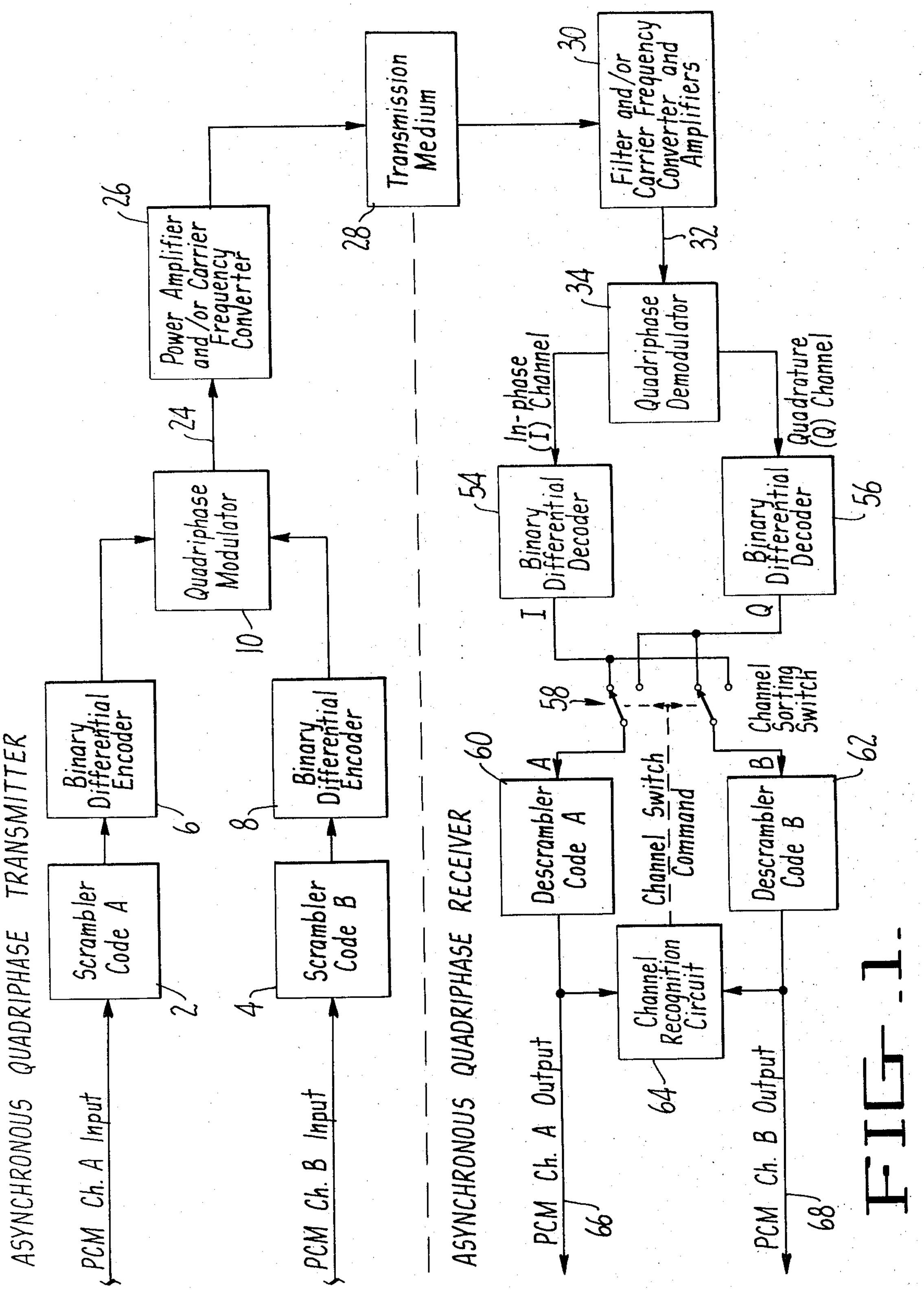
FIG. 1 is a block diagram of the overall asynchronous quadriphase communication system.
Figure 2:
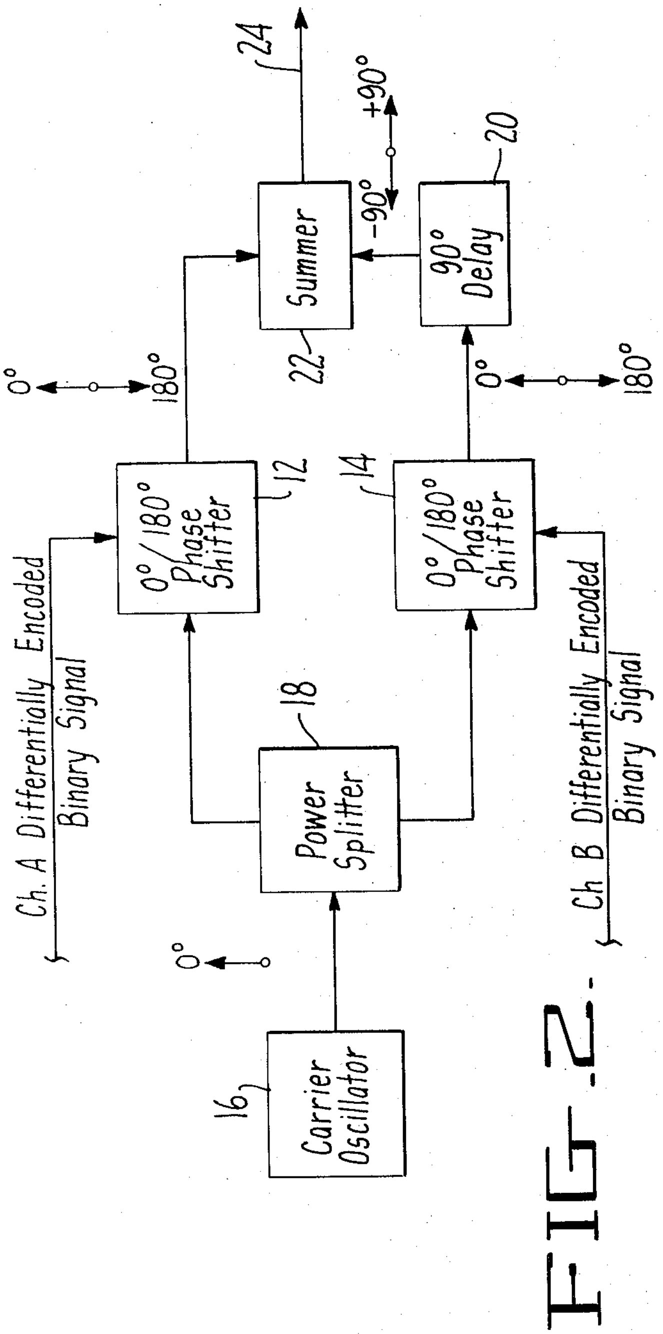
FIG. 2 is a block diagram of the quadriphase modulator.
Figure 3:
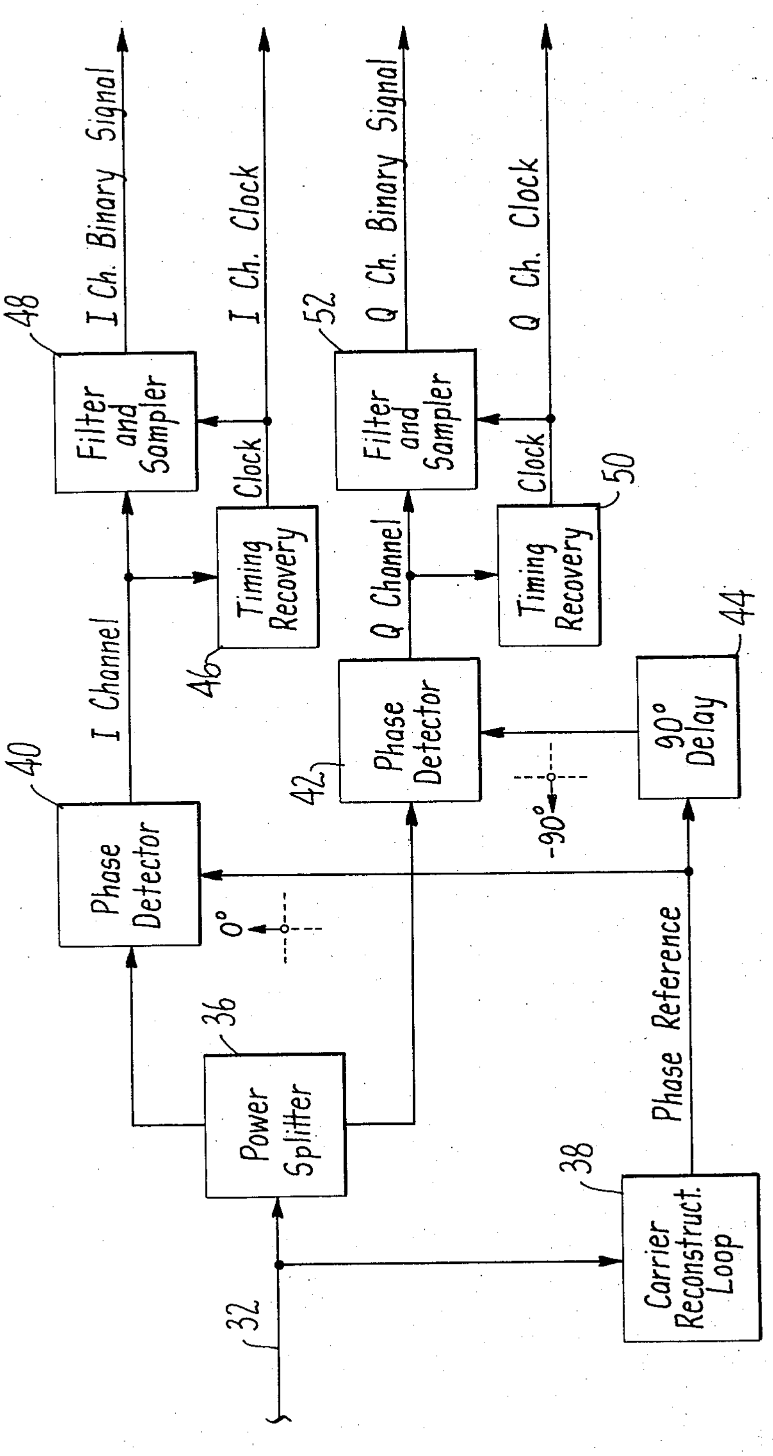
FIG. 3 is a block diagram of the quadriphase demodulator.

Referring now to FIGS. 1–3 of the drawings, wherein FIG. 1 shows a basic block diagram of the overall asynchronous quadriphase transmitter/receiver system utilizing scramblers and descramblers, FIG. 2 shows a functional block diagram of the quadriphase modulator of FIG. 1 and FIG. 3 shows a functional block diagram of the quadriphase demodulator of FIG. 1.

A pair of PCM (pulse code modulation) data channels A and B, which are not in synchronism with each other, are applied, respectively, to a code A scrambler 2 and a code B scrambler 4. The scrambler codes A and B are sufficiently different so that the scrambled PCM signals can be distinguished in the receiver portion of the system. The scramblers are of conventional design and may take many specific forms. The output of each scrambler is applied to a pair of binary differential encoders 6 and 8, respectively, in order to modify each PCM channel for quadriphase modulation. The binary differential encoders 6 and 8 coupled with binary differential decoders in the receiver provides for resolution of the binary polarity ambiguity within each phase quadrature channel. The binary differential encoders are also per se conventional.

The outputs of the encoders 6 and 8 are applied to a quadriphase modulator 10, which is shown in greater detail in FIG. 2. Each of the two phase shifters 12 and 14 is independently controlled by one PCM channel. The binary data driving each phase shifter has been scrambled and differentially encoded. A binary zero at the differential encoder input results in no change in the corresponding phase shifter output; a binary 1 causes a 180° phase shift. The phase shifters 12 and 14 operate on a carrier at 0° derived from a carrier oscillator 16 and power splitter 18.

A 90° delay means 20 receives the phase shifter 14 output to provide a −90°/+90° phase shifting signal which is summed along with the phase shifter 12 output in a summer 22 to provide a four phase signal on line 24 to the power amplifier and/or carrier frequency converter 26 that is a conventional unit chosen to match the available transmission medium 28.

Similarly, the transmission medium determines the form of the receiver front-end filter, carrier frequency converter and amplifiers 30. These are also conventional communications circuits. The output of block 30 is applied on line 32 to the quadriphase demodulator 34, which is shown in greater functional detail in FIG. 3.

The received signal on line 32 is applied to a power splitter 36 and a carrier reconstruction loop 38. The carrier reconstruction loop 38 includes a phase-locked oscillator that maintains a fixed phase relationship with one of the four phase states of the received signal. The output of the carrier reconstruction loop oscillator provides the phase reference for demodulating the quadriphase signals. The power splitter 36 divides the received signal for application to phase detectors 40 and 42 that receive the phase reference signal (an arbitrary 0°) and a −90° reference signal (the phase reference signal delayed by 90° delay 44), respectively, to provide independent demodulation of the two phase quadrature signals. At this point in the receiver, there is no unique relationship between the phase detector outputs and the original inputs to the quadriphase modulator in the transmitter. This ambiguity occurs because the carrier reconstruction oscillator will phase-lock to any one of the four possible phase states and retain that phase relationship unless it loses phase-lock due to loss of signal or very high noise level.

The phase detector 40 output, designated the in-phase or I channel is applied to a conventional timing recovery circuit 46 to provide I channel clock pulses, and is applied to a conventional filter and sampler circuit 48 that provides a clean I channel binary signal. In the same manner the phase detector 42 output, designated the quadrature or Q channel, is applied to a timing recovery circuit 50 and filter and sampler circuit 52.

The I channel binary and clock signals are applied to binary differential decoder 54 and the Q channel binary and clock signals are applied to binary differential decoder 56. The I channel may, for example, represent the original A channel or the B channel or one of the original channels with reversed polarity. The binary differential encoder and decoder in each channel resolve the polarity ambiguity but it remains for the receiver to uniquely identify the I and Q channels with the original A and B channels. The remainder of the receiver circuitry in FIG. 1 does this function. This circuitry consists of a channel sorting switch 58, a pair of descramblers 60 and 62 and a channel recognition circuit 64. The descramblers 60 and 62 are matched to scrambling codes A and B in the transmitter portion. The channel recognition circuit 64 monitors the scramblers' output to look for the unique channel identifying characteristics. If none is received a channel switch command is made and the channel sorting switch 58 reverses the inputs to the descramblers. The result is the original PCM channels A and B on the output lines 66 and 68.

Although the present invention is applicable to many types of digital signalling systems, it is particularly useful with the "T1 system mentioned above. The remaining figures are directed primarily to a more specific system which accepts T1 signals at its input as one example of the invention.

Figure 4:
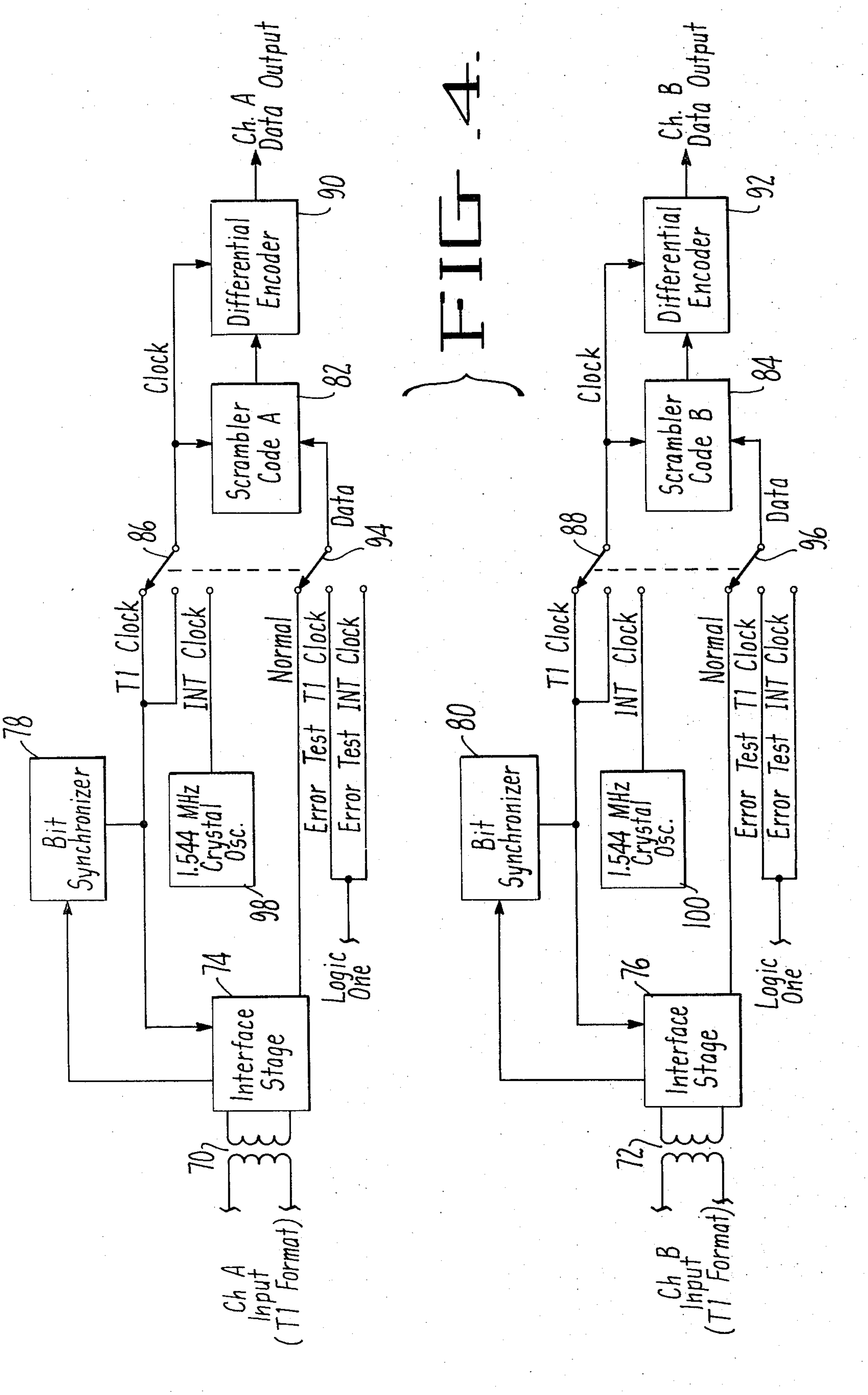
FIG. 4 is a block diagram of the transmitter baseband configuration.

FIG. 4 shows a functional block diagram of the baseband data conditioning circuit. The baseband data conditioning circuitry accepts PCM signals in T-carrier, 50 percent bipolar format, performs scrambling and differential encoding operations on them, and outputs a binary data stream suitable for driving a phase modulator. Two asynchronous PCM signal sources at a nominal 1.544 Mb/s rate are processed simultaneously.

Bipolar PCM data from each data channel is transformer coupled by transformers 70 and 72 to its respective interface stage 74 and 76 where it is converted into non-return-to-zero (NRZ) format. The data drives a bit synchronizer 78 and 80 which is used to selectively extract the clock frequency from the input signal spectrum. In the normal mode of operation both the NRZ data and the externally derived clock from the bit synchronizer are switched into a data scrambler 82 and 84 by means of a three-position toggle switch 86 and 88. The scrambler operation is performed by modulo-two summing the NRZ data with an internally generated pseudo-noise sequence. The scrambled data is then differentially encoded by encoders 90 and 92 before it is fed to the phase modulator. The differential encoding operation causes a transition in the output data for every input data bit at a logic one. Essentially this operation results in the data information being conveyed in the relative transitions of the data rather than in the absolute magnitude of the data itself, thus avoiding data ambiguity which would otherwise exist at the receive end because of the absence of an absolute phase reference in the receiver.

In addition to the normal mode of operation described above there are also two test modes, one for each channel, in which the input data is essentially disconnected from the scrambler and a steady logic level substituted for it by means of the three-position toggle switch 94 and 96, which is ganged to the toggle switches 86 and 88. This allows the pseudo-noise (PN) sequence of the scrambler to be fed unaltered to the differential encoder for subsequent transmission. Although the PN sequence has random like properties, the pattern is deterministic and thus can be examined on a bit-by-bit basis at the receive end for the occurrence of bit errors. The test modes use either the phase-locked clock derived from the external data or an internally generated crystal controlled clock. This furnishes a stable clock to the scrambler and differential encoder when in the test mode and allows testing to be performed in the absence of an input data source. A separate crystal oscillator 98 and 100 is provided for each channel. Separate switches are also provided for each channel so that either channel can be tested independently of the other using either internal or derived T1 clock.

The clock obtained from the bit synchronizer is inhibited when the bit synchronizer is out of lock. This inhibit feature prevents a clock rate in excess of the 1.544 MHz maximum being applied to the modulator if the T1 input data is removed.

The scrambling operation is performed on the input data for the following reasons: first, it guarantees that active data will always be transmitted over the channel even though the input data may temporarily be all zeros. This in turn enables the bit synchronizer at the receive end to stay in lock; second, it spreads the spectral components which may otherwise exist due to the characteristics of the input data; third, it provides a unique means of channel identification at the receive end; and fourth, it provides a means of performing an error test on the link.

Figure 5B:
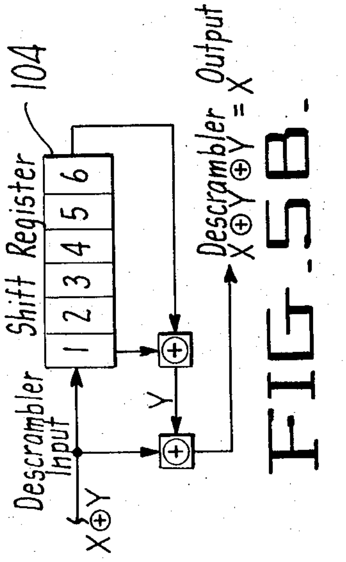
FIG. 5B is a schematic block diagram of the receiver descrambler.
Figure 5A:
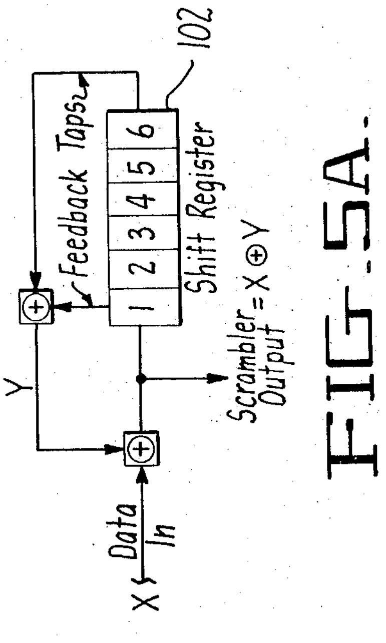
FIG. 5*a* is a schematic block diagram of the transmitter scrambler.

FIGS. 5*a* and 5*b* show the respective scrambler and descrambler operations in greater detail. The scrambler essentially consists of a six stage shift register 102 with feedback taps enabling it to generate a PN sequence. The feedback taps selected result in a maximum length sequence of $2^N-1$ bits where N is the number of stages in the register. For this case $N = 6$, the sequence length is 63 bits and the feedback taps are either taken from stages 6 and 5 or stages 6 and 1. The scrambled output is the modulo-two sum of the data input, X, and the output of the feedback shift register, Y.

When this scrambled output ($X \oplus Y$) is applied directly to the input of similarly configured feedback shift register 104 and the shift register output (Y) is then modulo-two summed with the input, the original data input to the scrambler, X, is recovered. The channel A scrambler utilizes feedback taps 6 and 1, whereas the channel B scrambler utilizes taps 6 and 5.

Utilization of the scrambler for uniquely identifying channels is accomplished by using a different pseudo-noise (PN) sequence for each data channel. The inverse operation must be performed at the receive end to properly descramble the data and these descramblers are configured to be compatible with the unique PN sequences generated by their respective scramblers. Thus, channel identification is performed by monitoring the data output of the descramblers in the receiver and looking for some known characteristic of the input data such as a framing or sync bit. Absence of a framing or sync bit out of the descrambler implies that the data channels are being routed to the wrong descramblers due to a channel reversal in the transmission path. Similarly absence of a steady logic level out of the descramblers when in the test mode indicates that the channels are reversed. When a channel reversal has taken place, this situation is easily remedied by switching the opposite channels into the respective descramblers.

Figure 6:
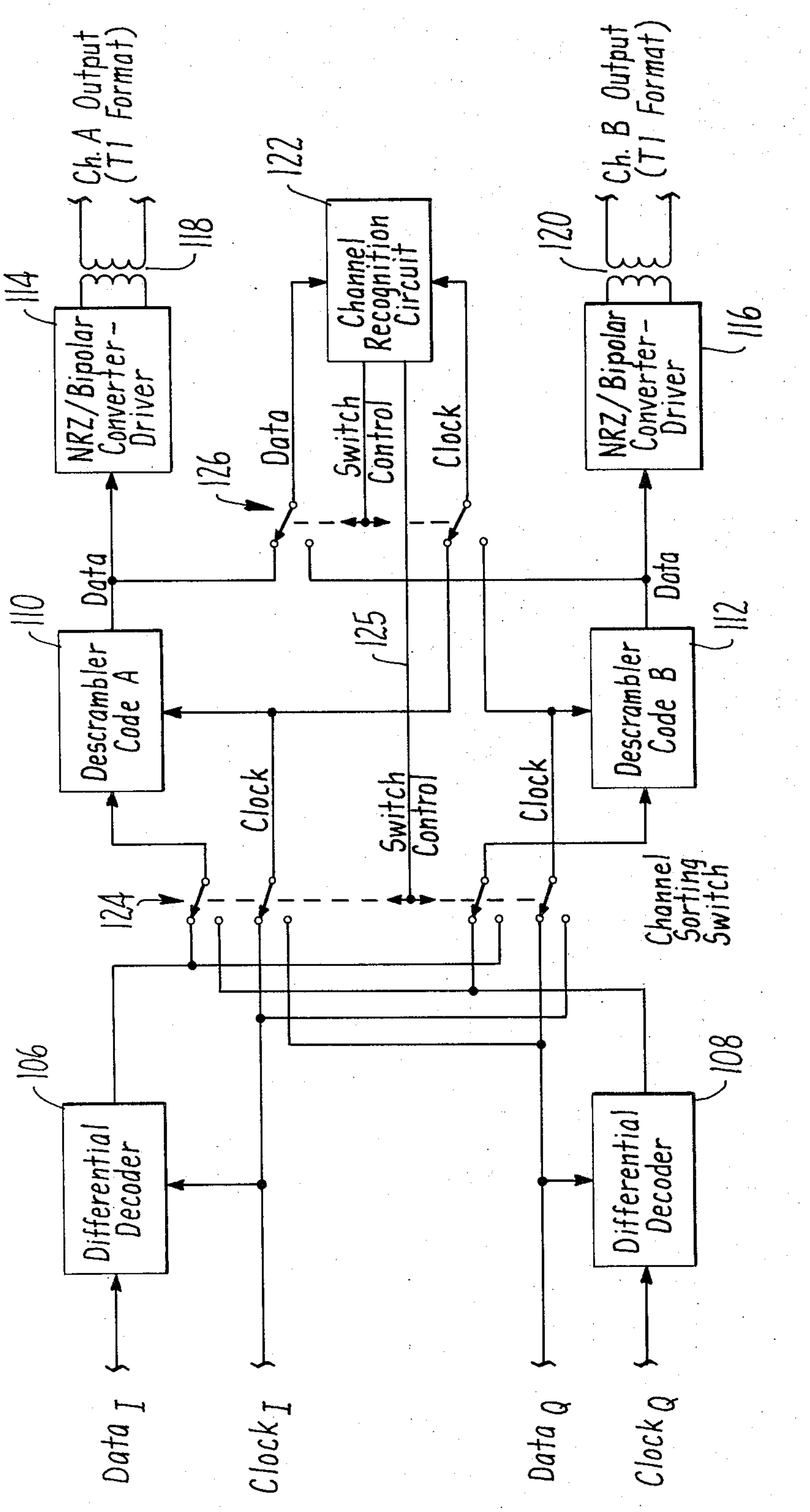
FIG. 6 is a block diagram of the receiver baseband configuration.

A functional block diagram of the receiver baseband configuration is shown in FIG. 6. The receive portion of the baseband data conditioning circuitry performs the inverse of those operations done in the transmit portion. Both the in-phase and quadrature (I & Q) data channels are differentially decoded by decoders 106 and 108 descrambled by descramblers 110 and 112, and converted into bipolar PCM in T1 format by NRZ bipolar converter-drivers 114 and 116 for application to T1 lines by transformers 118 and 120. The I and Q channels however must be properly descrambled in order to generate the correct channel A and B outputs. The channel recognition circuit (CRC)122 performs this function of steering the differentially decoded I and Q channels into the appropriate descramblers by controlling a pair of switches 124 and 126. The operation of the CRC is explained in detail below.

Figure 7:
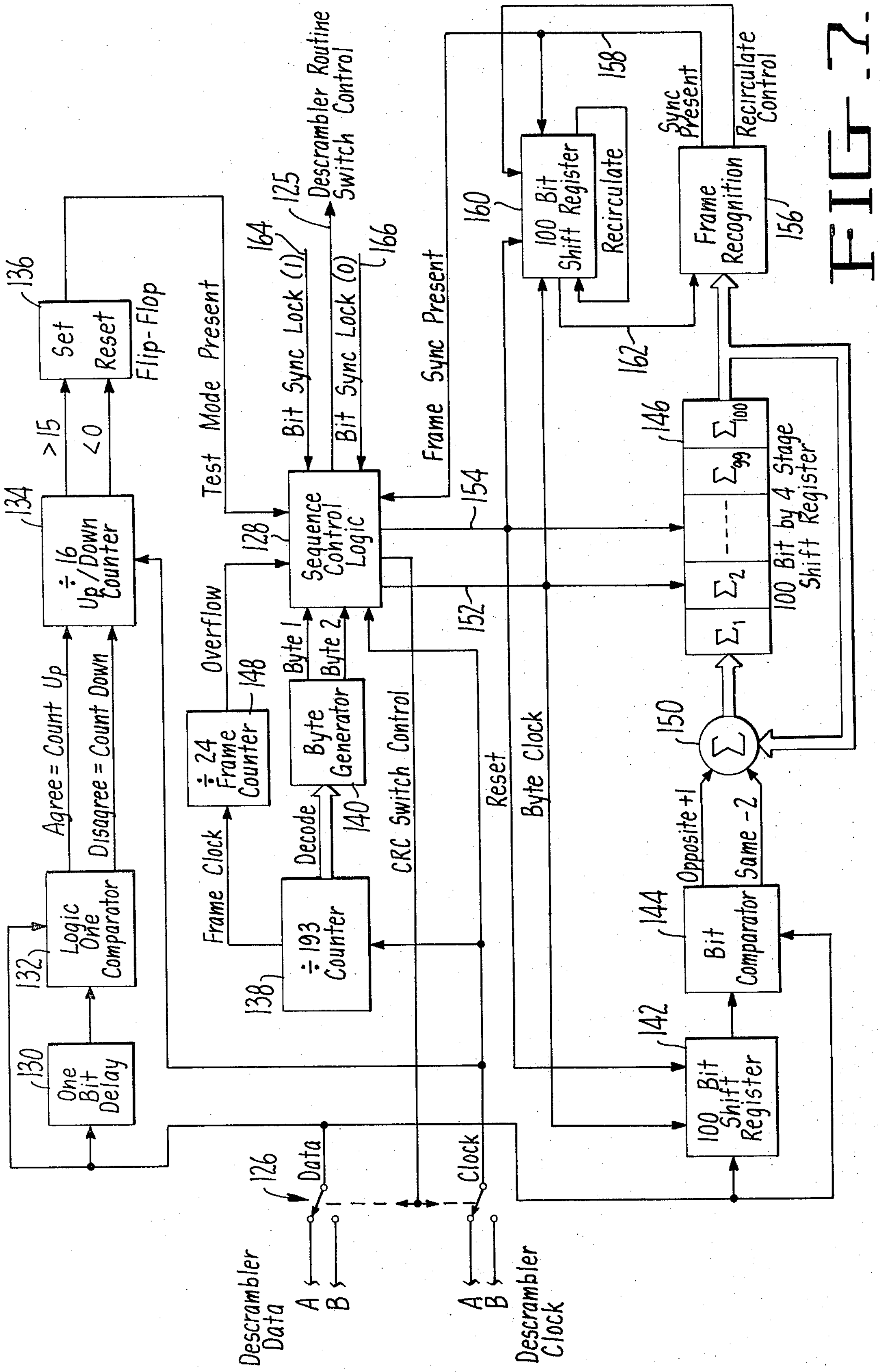
FIG. 7 is a block diagram of the channel recognition circuit.

Details of the channel recognition circuit (CRC) 122 are shown in FIG. 7. The channel recognition circuit examines the descrambler outputs in order to determine if the data is being routed through the proper descramblers. When data in T1 format is being transmitted the CRC decision is based upon its ability to recognize the presence of a framing bit which occurs once every 193 bits. A framing bit will be present only if the differentially decoded data is routed through the appropriate descrambler whose code agrees with that utilized in transmitting the data. Alternatively the other allowable data format occurs when the data channel is being tested. Under this condition when the data is routed through the correct descrambler a continuous logic one level results. If this condition occurs it is recognized by the CRC in lieu of a framing bit and proper data routing is assumed. The CRC thus will choose the correct data routing automatically whether the test mode or T1 data is being transmitted; the CRC does not know a priori which mode is being transmitted. Inability of the CRC to recognize either a framing bit or the test mode will cause the CRC to search until either of these two possible conditions are satisfied. When the CRC is in the search mode, it first examines the output of one descrambler then switches and examines the output of the second descrambler in a sequential manner. If this does not result in successful acquisition, the CRC will then crisscross the inputs to the descramblers and re-examine their outputs again. This search procedure will assure success even though only one channel is carrying active (valid) data.

Clock and data from one of the two descramblers is selected as the input to the CRC by the sequence control logic 128 that controls switch 126. The data is examined simultaneously by two portions of the circuit to determine if either a framing bit or continuous logic one level is present corresponding to T1 data or test mode data.

The test mode determination is performed by comparing each data bit with the previous bit using one bit delay 130 and logic one comparator 132 and incrementing an up/down counter 134 each time there is a logic one agreement. Conversely, when there is not a logic one agreement, the counter is decremented. An overflow from the counter (count>15) sets a flip-flop 136 indicating that the test mode has been recognized. In order to reset the flip-flop the counter has to decrement down to zero. Selection of this set and reset criteria provides error immunity when in the test mode. Once the test mode flip-flop has been set the sequence control logic 128 ceases to search and retains the existing data routing through the descramblers.

The presence of a framing bit is determined by examining successive frames of data for the characteristic alternating pattern. It will be apparent that the system will detect any repetitive pattern and thus will function equally well with codes other than the T1 code. The input clock from the descrambler via switch 126 is divided in a divide by 193 counter 138 to provide a local frame reference clock; the local frame clock does not ordinarily coincide with the transmitted frame. A byte generator 140 decodes the counter 138 output to partition each local frame into two overlapping 100 bit bytes. The byte 1 line provides a signal during the first 100 bits of the local frame to logic 128; the byte 2 line provides a signal during the 94th through 193rd bits of the local frame to logic 128. Ease of implementation influenced this particular choice of partitioning even though seven bits of data are common to both bytes. The local frame clock is divided in a divide by 24 frame counter 148 to provide an overflow signal every 24 frames to the logic 128.

The same byte is examined for 24 successive frames. If no framing bit is recognized by that time, the second byte of that frame is examined for 24 successive frames. If still no framing bit appears, the sequence and control logic will switch over to the other data and clock input to the CRC from the second descrambler and repeat the frame search. Finally, if this search is not successful the sequence and control logic will reroute the inputs to the descramblers and sequentially re-examine the descrambler outputs again for a framing bit. This cycle repeats until either a framing bit or test mode pattern is found.

The byte clock line 152 from logic 128 is a gated clock that provides descrambler clock pulses only during byte 1 or byte 2, depending on which byte is being looked at. The reset line 154 from logic 128 provides a pulse at the end of 24 frames when there is no channel recognition.

As was mentioned previously, each frame is examined 100 bits at a time for 24 successive frames. Descrambler data from switch 126 is clocked into a 100 bit shift register by the byte clock and simultaneously compared bit-by-bit in a bit comparator 144 with the corresponding byte from the previous frame (which was stored in the shift register). Each two bit comparison which satisfies the alternating pattern requirement adds one to the total count recorded for that particular bit location. Conversely, failure to satisfy the alternating pattern will cause two to be substracted from the count. A separate count is kept for each of the 100 bit locations by storing the sum from summer 150 in a 100-bit by four-stage shift register 146. The number or sum registered in each of the 100 bit locations is up-dated once each frame. The criteria for deciding that the alternating pattern of the framing bit has been met is when the sum corresponding to any particular bit location reaches a full scale value of 15. Frame recognition circuit 156 recognizes a bit location having a count of 15 and generates a sync present signal on line 158 to a 100 bit shift register 160 and to logic 128. Register 160, which is clocked by the byte clock, stores a pulse at the bit location corresponding to the location of the 15 count and provides a signal to frame recognition circuit 156 on line 162 whenever that location is reached. Thus the frame recognition unit can look at the count at that location during subsequent frame and if it goes below eight the sync present signal on line 158 is removed and the recirculate control erases the bit in register 160.

When the sync present signal occurs on line 158 the sequence and control logic 128 locks its existing configuration and continues to select the same byte of each succeeding frame for subsequent examination. The sequence and control logic remains locked in this mode until the count corresponding to that bit location which had previously reached 15 has been reduced to less than eight. This event reinitiates the search pattern. Upon reinitiation, the count stored for each bit location is cleared to zero.

The count of 15 out of a search of 24 frames was selected to provide a degree of error immunity consistent with ease of implementation. Incrementing the sum being recorded for each bit location by one and decrementing by two based upon the success/failure outcome of the bit comparisons between successive frames was done to reduce the number of false locks as well as to minimize the time that a false lock persists due to random data. The weighting of the increment/decrement ratio in this fashion also accelerates the time in which a search procedure will be initiated should a channel reversal occur in the transmission path.

Bit sync lock indicators I and Q on lines 164 and 166 from both the in-phase and quadrature data recovery circuits are utilized by the sequence control logic 128 to avoid searching through a channel that does not contain valid data.

Figure 8:
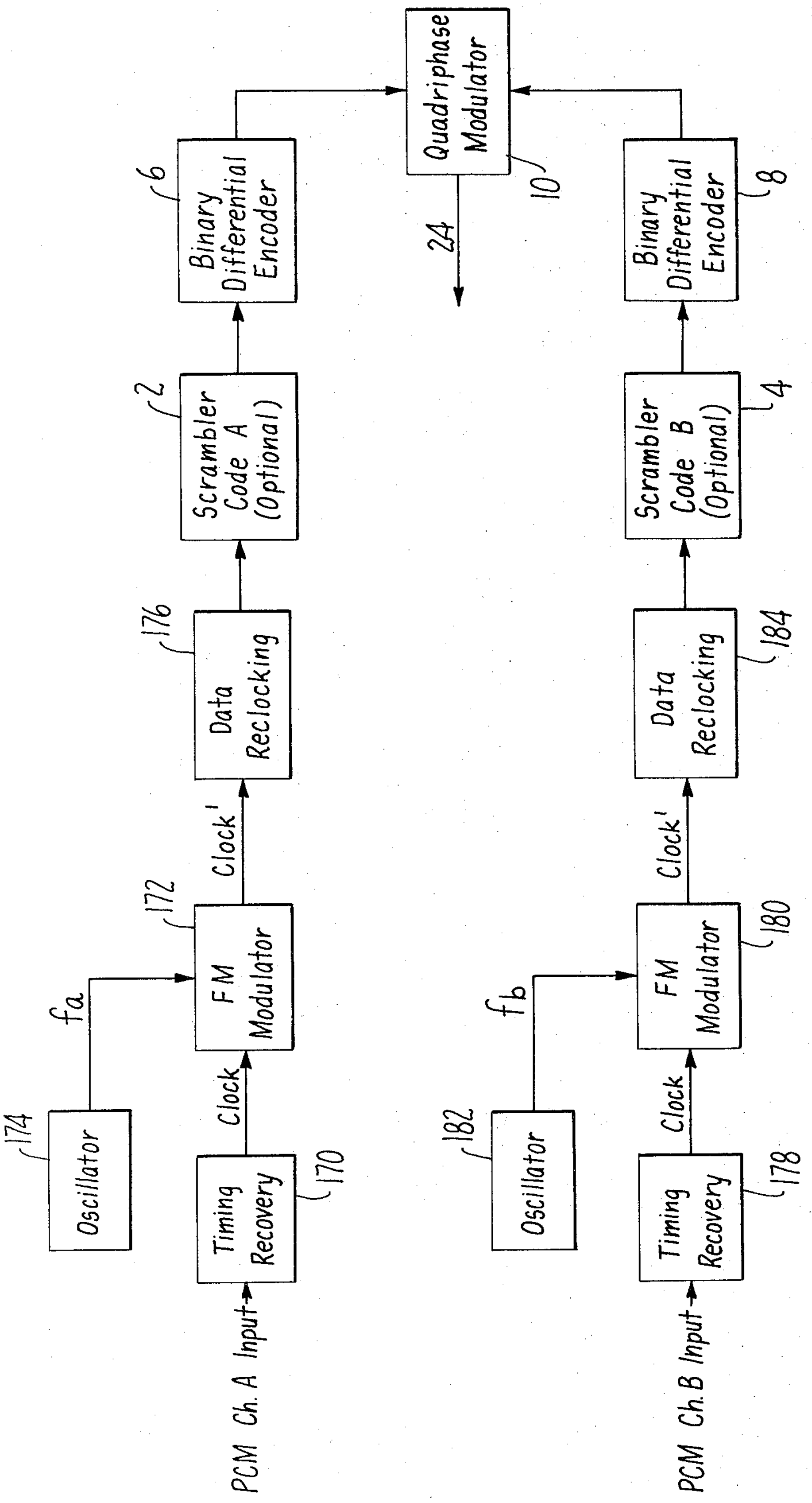
FIG. 8 is a block diagram of a portion of the transmitter section of the asynchronous quadriphase communication system for use with a code having no regularly occurring characteristics.
Figure 9:
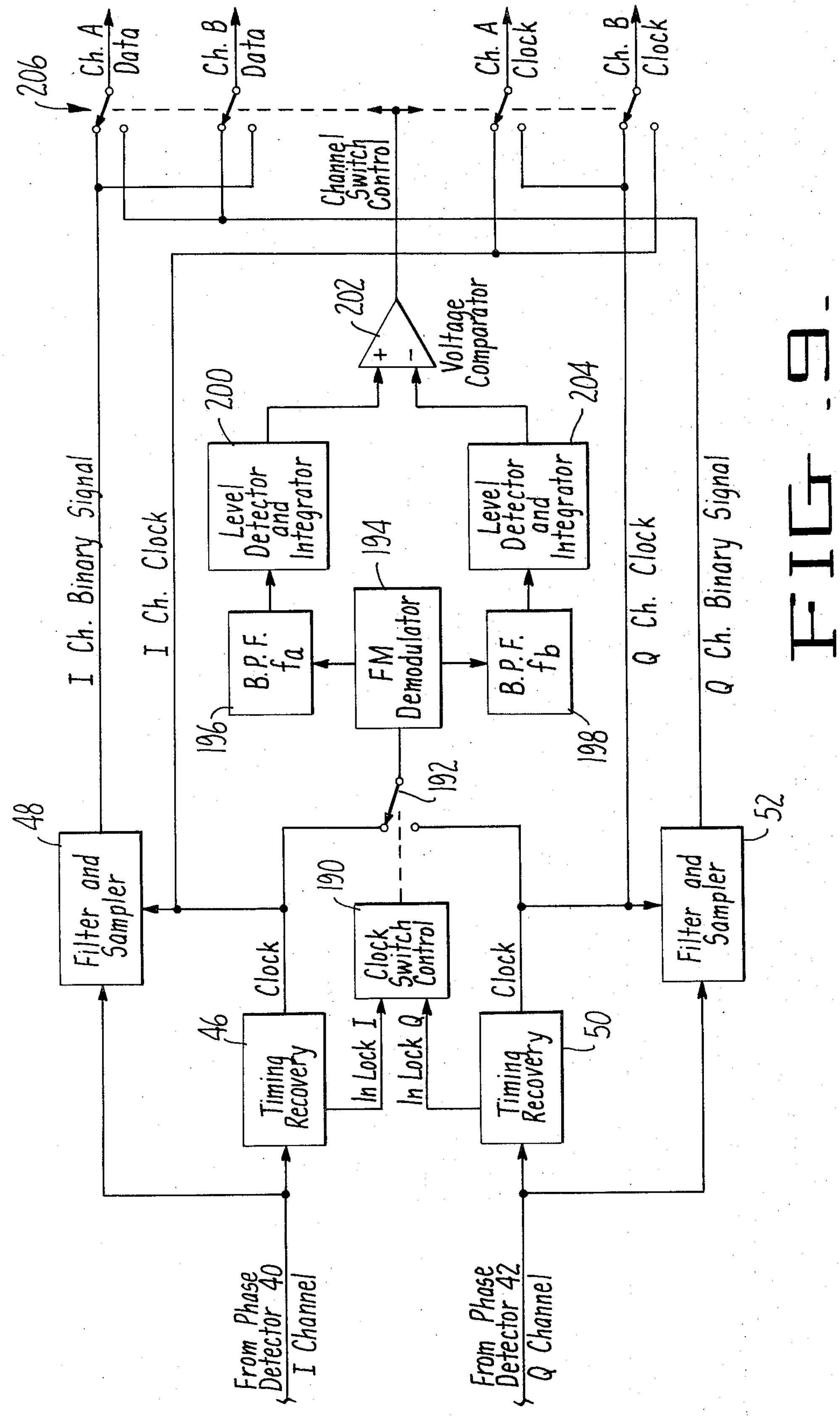
FIG. 9 is a block diagram of a portion of the receiver section of the asynchronous quadriphase communication system for use with a code having no regularly occurring characteristics.

FIGS. 8 and 9 show modifications to the embodiment of the invention shown in FIGS. 1–7 for use with binary input signals that do not possess known and regularly occurring characteristics. The approach of the alternative embodiment does not require unique scrambling-/descrambling operations in conjunction with known characteristics of the input data to properly identify the channels at the receiver. Instead, it modifies the timing of each channel in a small but detectable manner to enable unique data channel identification at the receiver.

A block diagram functionally depicting the implementation of this technique for the transmitter baseband circuitry is shown in FIG. 8. Channel A data is connected to a conventional timing recovery circuit 170 which extracts and regenerates the timing clock associated with that data. This clock is then frequency modulated in an FM modulator 172 by a low frequency signal, $f_a$ from an oscillator 174. The index of modulation is kept small enough so that the resulting clock exhibits only minor timing variations that are known and detectable. The modified clock is then used to reclock the data in data reclocking means 176 for subsequent encoding and scrambling operations prior to driving the phase modulator 10. The scrambler 2, although not required for channel identification, can still be utilized for ease of data recovery at the receiver as well as for providing a means of performing a self test. Channel B data is processed in a similar manner by timing recovery circuit 178, FM modulator 180, oscillator 182, and data reclocking circuit 184 but its clock is modulated by a different low frequency signal $f_b$. Modulation of the clock by $f_a$ or $f_b$ can most easily be implemented by summing these signals with the normal control voltage driving the voltage controlled oscillator of the phase locked loop contained in the respective timing recovery circuits 170 and 178.

A functional block diagram of that portion of the receiver baseband circuitry required to recognize and distinguish between the two asynchronous channels is shown in FIG. 9. The phase detected output from the I channel is connected to a timing recovery circuit 46 similar to that used in the transmitter. The resulting clock output drives a filter and sampler or data recovery circuit 48 to generate NRZ data and is also connected to a switch 192. The output of the switch 192 is connected to an FM demodulator 194 which drives two bandpass filters 196 and 198, one turned to $f_a$ and the other to $f_b$. The filter outputs are then detected and integrated in circuits 200 and 204 and compared against each other in voltage comparator 202. The results of the comparison then control the channel routing switch 206 in accordance with which signal $f_a$ or $f_b$ predominates. If channel I corresponds to channel A, the level of $f_a$ will exceed $f_b$ and the comparator 202 output causes switch 206 connect the channel A output to channel I. If $f_b$ exceeds $f_a$, switch 206 reverses the channels. Thus if $f_a>f_b$, channels I and A are connected; if $f_b>f_a$, channels I and B are connected. The data and clock outputs from switch 206 are applied to binary differential encoders such as 54 and 56 of FIG. 1.

The clock switch control 190 will normally direct the I channel clock to the FM demodulator 194 when the I channel is in lock. If the I channel is not in lock, however, due to loss of data, then the clock switch control will direct the Q channel clock to the FM demodulator 194 so that only one data channel need be present in order for a correct decision to result.

The communications system thus described herein provides for transmitting and receiving two independently timed (asynchronous) binary data signals on a single quadriphase carrier. The system is not limited to data signals having a non-random characteristic.

Although the best mode for practicing the invention has been disclosed herein, it will be apparent to those of ordinary skill in the art that the embodiments disclosed may be modified without departing from the scope of the invention. The invention is thus to be limited only by the scope of the appended claims.

We claim:

1. In a communications system transmitting two independently timed binary data signals on a single quadriphase modulated carrier through a transmission medium, the combination comprising A. means receiving said two independently timed binary data signals for continuously uniquely identifying each of said signals, said means preserving the independent timing of said data signals, B. means receiving said uniquely identified independently timed data signals for generating a quadriphase modulated carrier signal in accordance with said signals, and C. means for applying said quadriphase modulated carrier signal to said transmission medium.

2. The combination of claim 1 wherein said data signals have a non-random characteristic and further comprising A. means receiving said quadriphase modulated carrier signal from said transmission medium for quadriphase demodulating said carrier signal to provide first and second demodulated signals, B. means receiving said first and second demodulated signals in either of two senses for removing said unique identification from said first and second signals to provide third and fourth signals corresponding to said independently timed binary data signals when said first and second signals are applied in the correct sense, and means receiving said third and fourth signals for recognizing said non-random characteristic in said third signal or said fourth signal and for reversing the sense of application of said first and second signals to said removing means when said characteristic is not recognized.

3. Apparatus according to claim 2 wherein said means for uniquely identifying each of said binary data signals comprises means for scrambling each of said signals with distinct scrambling codes and wherein said means for removing said unique identification from said first and second signals comprises descrambling means having descrambler codes corresponding to said distinct scrambling codes for providing said third and fourth signals corresponding to said binary data signals when the correct descrambler code is matched with the corresponding first and second signals.

4. The combination of claim 3 wherein said means for recognizing said non-random characteristic comprises means for comparing successive bits in one of said third and fourth signals to provide a count up signal when two successive bits correspond and to provide a count down signal when two successive bits do not correspond, and means receiving said count up and count down signals for providing a recognition signal when a predetermined up count is reached.

5. The combination of claim 3 wherein said means for recognizing said non-random characteristic comprises means for selecting predetermined equal bit segments of one of said third and fourth signals, means receiving said bit segments for monitoring each bit position to provide an up count when the corresponding bit position in consecutive bit segments is corresponding and to provide a down count when the corresponding bit does not correspond, means receiving said counts for each bit position and for providing an output signal when the count for any one of said bit positions reaches a predetermined value.

6. The combination of claim 5 wherein said means receiving said segments provides an up count of 1 when the bit position corresponds and provides a down count of 2 when said bit positions do not correspond.

7. The combination of claim 6 further comprising means for providing a recognition signal in response to said output signal and for cancelling said recognition signal when the bit location that reached said predetermined count falls below a second predetermined count.

8. The combination of claim 7 wherein said independently timed binary data signals are first and second T1 signals asynchronous with respect to each other and said non-random characteristic is the T1 framing signal.

9. The combination of claim 5 further comprising means for providing a recognition signal in response to said output signal and for cancelling said recognition signal when the bit location that reached said predetermined count falls below a second predetermined count.

10. Apparatus according to claim 1 wherein said data signals have a non-random characteristic wherein said means for uniquely identifying each of said binary data signals comprises means for scrambling each of said signals with distinct scrambling codes, said scrambling codes being independently timed.

11. Apparatus according to claim 1 wherein said means for uniquely identifying each of said binary data signals comprises means for frequency modulating the data clock of each of said binary data signals with a distinct low frequency signal.

12. The combination of claim 1 further comprising means receiving said quadriphase modulated carrier signal from said transmission medium for quadriphase demodulating said carrier signal to provide first and second demodulated signals, first switching means, including a pair of inputs and a pair of outputs receiving said first and second demodulated signals for switching the sense of said signals to provide said independently timed binary data signals when said first and second signals are taken in the correct sense, and means, including second switching means, for selectably receiving either said first or second demodulated signals for processing said first or second signal to remove said unique identification from said first or second signals to provide a third signal corresponding to said unique identification for recognizing the unique identification in said third signal corresponding to the unique identification in one of the independently timed binary signals when said first or second signals are received in the correct sense and for reversing the sense of said first and second switching means when said identification is not recognized.

13. Apparatus according to claim 12 wherein said means for uniquely identifying each of said binary data signals comprises means for frequency modulating the data clock of each of said binary data signals with a distinct low frequency signal and wherein said means for providing a third signal corresponding to said unique identification comprises a frequency modulation demodulator.

14. Apparatus according to claim 13 wherein said means receiving said third signal for recognizing the unique identification comprises a pair of band pass filters receiving the output of said frequency modulation demodulator tuned to pass each of said low frequency signals, means for level detecting and integrating the output of each of said filters, and means for comparing the integrated signals to provide a control signal to said switching means.

15. A method of transmitting two independently timed binary data signals on a single quadriphase modulated carrier through a transmission medium comprising processing each of said signals to continuously uniquely identify each of said signals, while preserving the independent timing of said signals, generating a quadriphase modulated carrier signal in accordance with said uniquely identified independently timed signals, and applying said quadriphase modulated carrier signal to said transmission medium.

16. The method of claim 15 wherein said data signals have a non-random characteristic and further comprising receiving said quadriphase modulated carrier signal from said transmission medium, quadriphase demodulating said quadriphase modulated carrier signal to provide a pair of demodulated signals, processing said demodulated signals in either of two senses to provide said binary data signals when said unique identification is removed from said pair of demodulated signals in the correct sense, monitoring said binary data signals to detect said non-random characteristic, and reversing the sense of said pair of demodulated signals when said characteristic is not recognized.

17. The method of claim 15 further comprising receiving said quadriphase modulated carrier signal from said transmission medium, quadriphase demodulating said carrier signal to provide a pair of demodulated signals, switching the sense of said pair of demodulated signals to provide said independently timed binary data signals when said pair of demodulated signals are taken in the correct sense, selectably receiving one of said pair of demodulated signals for processing said one signal to remove said unique identification from said signal to provide a third signal corresponding to said unique identification, recognizing the unique identification in said third signal corresponding to the unique identification in one of the independently timed binary signals when said pair of demodulated signals are received in the correct sense, and selecting the other one of said pair of demodulated signals for processing to provide said third signal and reversing the sense of said pair of demodulated signals when said identification is not recognized.

18. In a communications system transmitting two independently timed binary data signals on a single quadriphase modulated carrier through a transmission medium, the combination comprising A. means receiving said two independently timed binary data signals for continuously uniquely identifying at least one of said signals, said means preserving the independent timing of said signals, B. means receiving said independently timed data signals from said last recited means for generating a quadriphase modulated carrier signal in accordance with said signals, and C. means for applying said quadriphase modulated carrier signal to said transmission medium.

19. The combination of claim 18 further comprising

A. means receiving said quadriphase modulated carrier signal from said transmission medium for quadriphase demodulating said carrier signal to provide first and second demodulated signals, B. means receiving said first and second demodulated signals in either of two senses for removing said unique identification from at least one of said signals to provide third and fourth signals corresponding to said independently timed binary data signals when said first and second signals are applied in the correct sense, and C. means receiving said first and second demodulated signals for recognizing said unique identification to control the sense in which said first and second demodulated signals are applied to said removing means.

* * * * *